(12) United States Patent
Liu

(10) Patent No.: US 8,029,148 B2
(45) Date of Patent: Oct. 4, 2011

(54) PROJECTING APPARATUS

(75) Inventor: I-Hsien Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 221 days.

(21) Appl. No.: 12/490,019

(22) Filed: Jun. 23, 2009

(65) Prior Publication Data
US 2010/0039627 A1    Feb. 18, 2010

(30) Foreign Application Priority Data

Aug. 14, 2008 (TW) .............................. 97131030 A

(51) Int. Cl.
*G03B 21/22* (2006.01)
(52) U.S. Cl. ........................................................ 353/119
(58) Field of Classification Search ............. 353/22–24, 353/65–67, 119–122
See application file for complete search history.

(56) References Cited

U.S. PATENT DOCUMENTS

| | | | | |
|---|---|---|---|---|
| 2,962,085 A | * | 11/1960 | Frank | 297/36 |
| 3,227,509 A | * | 1/1966 | Baker | 396/3 |
| 4,165,162 A | * | 8/1979 | Frey | 353/109 |
| 4,921,343 A | * | 5/1990 | Ushiro et al. | 353/66 |
| 5,490,655 A | * | 2/1996 | Bates | 248/329 |
| 5,743,503 A | | 4/1998 | Voeller et al. | |
| 6,179,426 B1 | | 1/2001 | Rodriguez, Jr. et al. | |
| 6,540,366 B2 | | 4/2003 | Keenan et al. | |
| 6,604,829 B2 | | 8/2003 | Rodriguez, Jr. | |

* cited by examiner

*Primary Examiner* — Georgia Y Epps
*Assistant Examiner* — Don Williams
(74) *Attorney, Agent, or Firm* — Kirton & McConkie; Evan R. Witt

(57) ABSTRACT

A projecting apparatus includes a casing, a projector and a foldable arm set. The foldable arm set is connected with the projector and selectively in a folded state or an unfolded state. The projector is capable of performing a projecting operation when the foldable arm set is in the unfolded state. A containing space is defined by the foldable arm set and the casing for containing the projector therein when the foldable arm set is in the folded state.

9 Claims, 6 Drawing Sheets

PROJECTING APPARATUS

FIELD OF THE INVENTION

The present invention relates to a projecting apparatus, and more particularly to a projecting apparatus that has a burglarproof function and is assembled by combining a projector with a cantilever.

BACKGROUND OF THE INVENTION

Generally, the designated values F indicative of the focal lengths of projectors are ranged from 1.8 to 2.4. According to the focal lengths, household projectors are usually classified into three types: short focal length projectors, medium focal length projectors and long focal length projectors. For example, the short focal length projector with F<1.6 is properly placed on the household coffee table. The medium focal length projector with F=2.0~2.4 is properly hung on the ceiling. The long focal length projector with F>2.4 is properly placed on the backside of the living room. Recently, the short focal length projectors capable of projecting out 80-inch images when spaced from the projection screen by a distance less than one meter are gaining popularity.

Take a projector used to give a lecture in classrooms for example. In views of the height and the location of the image to be projected, the projecting zone thereof is usually on a whiteboard or blackboard. In a case that a long focal length projector is used, the projector is placed on a desk or hung on a ceiling such that the projector may project images onto the whiteboard or blackboard. Whereas, in a case that a short focal length projector is used, the projector is usually fixed at a position in the vicinity of the whiteboard or blackboard because the projecting distance is about 80 cm~100 cm. In addition, the short focal length projector is fixed on a wall above the whiteboard or blackboard in a suspended or wall-hung manner. Since the short focal length projector is gradually adopted in the market, the structure and the assembling method of the short focal length projector are continuously improved in order to meet diverse demands. Depending on the structures, the retractile properties or the lens angles, a variety of projecting apparatuses are developed. For convenience, most projecting apparatuses are designed to be fixed above the projection screen. These projecting apparatuses, however, lack burglarproof functions. In addition, it is troublesome to store these projecting apparatuses.

FIG. 1 is a schematic perspective view illustrating a projecting apparatus described in U.S. Pat. No. 6,179,426. As shown in FIG. 1, the projecting apparatus 10 is fixed on a position above a projection screen (e.g. a whiteboard) 11. The projecting apparatus 10 may be rotated in the left or right direction and stored at a position near a wall above the projection screen 11. As shown in FIG. 1, the projecting apparatus 10 may be stored at the position A. When the projector of the projecting apparatus 10 is rotated to the position B, the projector may be used for projecting images. Since the lens of the projector is stored in the open space above or in front of the projection screen 11, the projector is easily stolen. Similarly, in U.S. Pat. Nos. 6,540,366 and 6,604,829, the lens of the projector is also stored in the open space above or in front of the projection screen. As such, similar drawbacks occur.

Therefore, there is a need of providing a projecting apparatus having a burglarproof function to obviate the drawbacks encountered from the prior arts.

SUMMARY OF THE INVENTION

The present invention provides a projecting apparatus having a burglarproof function.

In accordance with an embodiment of the present invention, there is provided a projecting apparatus. The projecting apparatus includes a casing, a projector and a foldable arm set. The foldable arm set is connected with the projector and selectively in a folded state or an unfolded state. The projector is capable of performing a projecting operation when the foldable arm set is in the unfolded state. A containing space is defined by the foldable arm set and the casing for containing the projector therein when the foldable arm set is in the folded state.

In an embodiment, the foldable arm set includes a plurality of rotatable arms and the rotatable arms are pivotally and serially connected with each other. The casing includes a top plate and a rear plate, and one end of the rotatable arms of the foldable arm set is connected to at least one of the top plate and the rear plate.

The projecting apparatus in accordance with the embodiment of the invention is assembled by combining a cantilever member and the projector together. The rotatable arms of the foldable arm set may be stretched or bent. In addition, the bending angles and the bending directions of the rotatable arms may be varied as required. When the projecting apparatus of the embodiment of the invention is in the folded state, the projecting apparatus is substantially box-shaped and has a burglarproof function. As a consequence, the possibility of losing the projector from stealing is largely reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be located in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
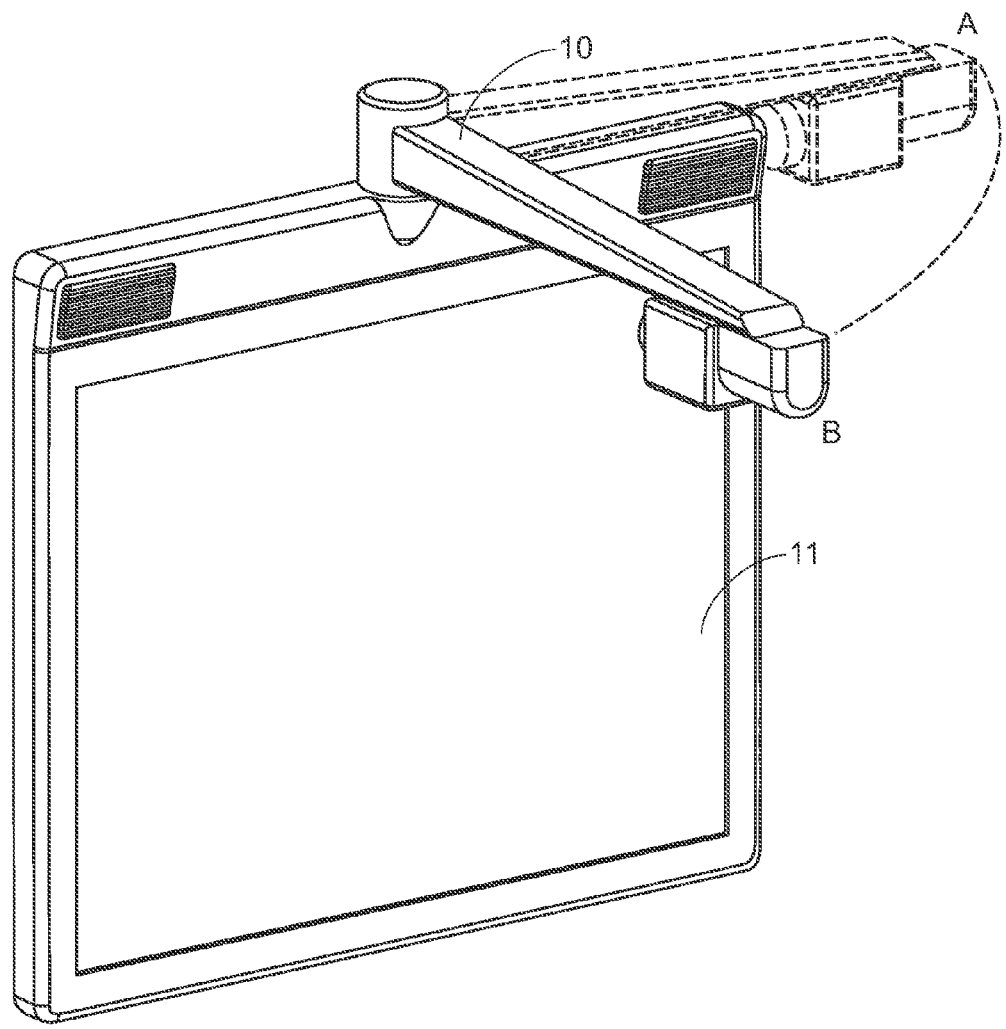
FIG. 1 is a schematic perspective view illustrating a projecting apparatus described in U.S. Pat. No. 6,179,426.
Figure 2A:
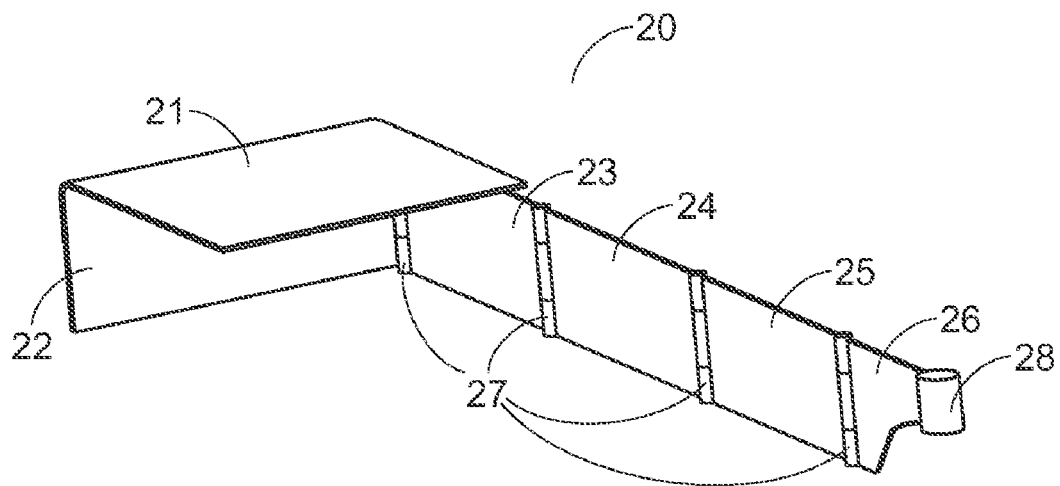
FIG. 2A is a schematic perspective view illustrating a cantilever member of a projecting apparatus in an unfolded state according to a first embodiment of the invention.
Figure 2B:
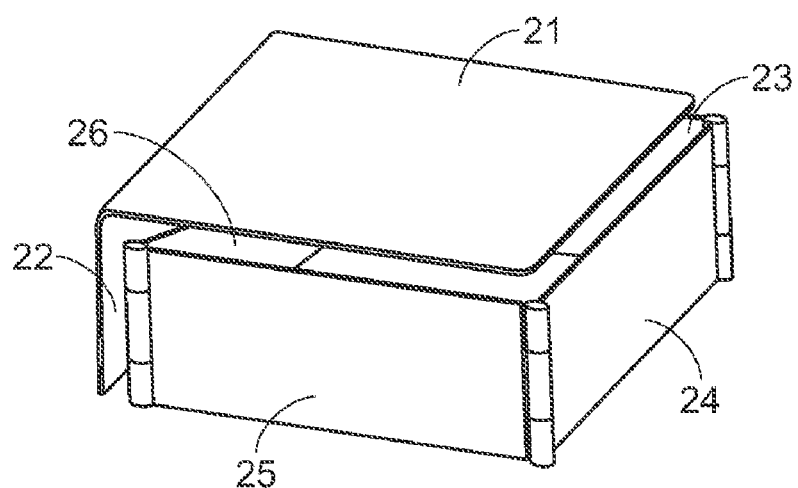
FIG. 2B is a schematic perspective view illustrating the boxed-shaped projecting apparatus after the rotatable arms of the foldable arms set are folded along the casing according to the first embodiment of the invention.

Referring to FIGS. 2A and 2B, the cantilever member 20 principally includes a casing and a foldable arm set. The casing includes a top plate 21 and a rear plate 22. The casing is produced by bending a sheet metal into an L-shaped platform according to the sheet metal technology. The bent sheet metal is divided into the top plate 21 and the rear plate 22. The edge surface of the top plate 21 or the edge surface of the rear plate 22 is pivotally connected to an end of a first rotatable arm 23 through a first hinge 27. The hinge 27 is made of plastic steel, for example. The other end of the first rotatable arm 23 is pivotally connected with an end of a second rotatable arm 24 through a second hinge 27. The other end of the second rotatable arm 24 is pivotally connected with an end of a third rotatable arm 25 through a third hinge 27. The other end of the third rotatable arm 25 is pivotally connected with an end of a fourth rotatable arm 26 through a fourth hinge 27. The other end of the fourth rotatable arm 26 is connected with a circular shaft 28. A projector may be pivotally connected with the circular shaft 28. In a case that these rotatable arms 23, 24, 25 and 26 are stretched to be vertical to the rear plate 22 to form a foldable arm set, that is to say, the foldable arm set includes a plurality of the rotatable arms 23, 24, 25 and 26, and the rotatable arms 23, 24, 25 and 26 are pivotally and serially connected with each other by a plurality of hinges. Meanwhile, a distal end of the first rotatable arm 23 is pivotally connected with at least one of the top plate 21 and the rear plate 22 and a distal end of the fourth rotatable arm 26 is connected with the projector. In response to an external force, the foldable arm set may be in an unfolded state or a folded state. In the unfolded state of the foldable arm set, the projector may be used to projecting images. On the other hand, when the rotatable arms 23, 24, 25 and 26 of the foldable arm set are folded to be in a folded state, a containing space is defined by the casing and the foldable arm set for containing the projector therein.

In this embodiment, the rotatable arms are hollow aluminum extrusion tubes produced by the aluminum extrusion technology. The aluminum extrusion technology makes the rotatable arms well-looking and strong enough to withstand the gravity of the projector, so that the possibility of downwardly tilting the rotatable arms or breaking the rotatable arms is minimized. Moreover, the rotatable arms 23, 24, 25 and 26 of the foldable arm set are connected by the hinges 27 and the hinges 27 are made of polyacetal or polyoxymethylene (POM) copolymer, and the polyacetal and polyoxymethylene (POM) copolymer are excellent in bending durability. As a consequence, in response to an external force, the rotatable arms may be stretched, bent or stayed at any position as required. Alternatively, the bending angles and the bending directions of the rotatable arms may be varied as required.

Importantly, the rotatable arms 23, 24, 25 and 26 of the foldable arm set are folded along the casing to define the containing space. As such, the projector pivotally connected to the distal end of the circular shaft 28 may be accommodated within the containing space so as to contain the projector within the casing. In this context, the casing and the foldable arm set are collectively referred as a cantilever member. After the junction between the foldable arm set and the casing is locked by means of a locking element (not shown), the projecting apparatus is substantially box-shaped and has a burglarproof function.

In this embodiment, the projecting apparatus of the embodiment of the invention is assembled by combining the cantilever member 20 and the projector together. After assembled, the projecting apparatus may be fixed on a wall. That is, according to the user's requirement, the casing of the projecting apparatus is fixed on a wall in a suspended manner or a wall-hung manner. As previously described, the projector of the conventional projecting apparatus is stored in the open space such that the projector is easily stolen. On the other hand, since the cantilever member 20 may be folded to have a box shape, the projector of the projecting apparatus may be protected by the folded cantilever member 20 to achieve a burglarproof function.

Figure 3A:
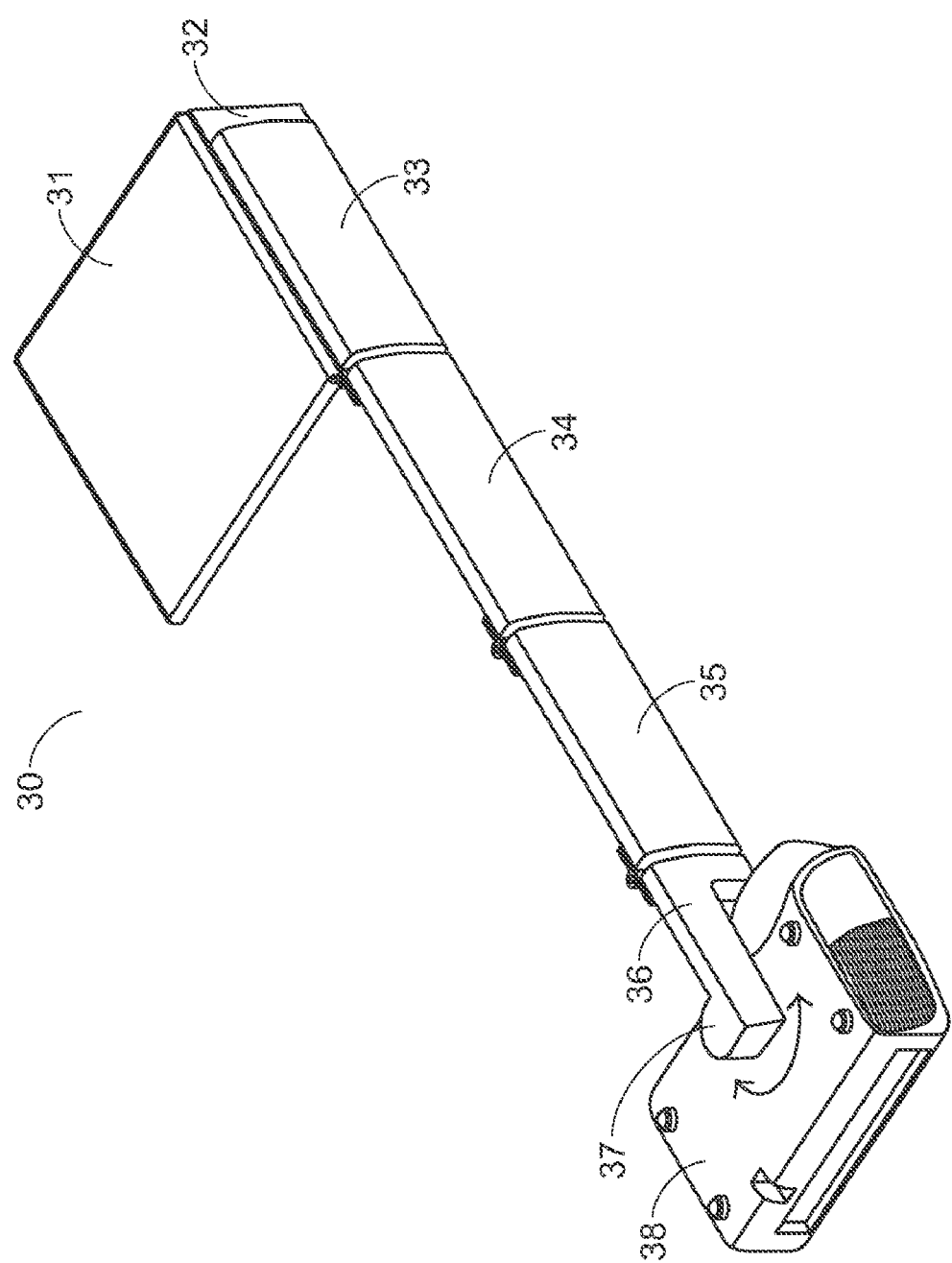
FIG. 3A is a schematic right-side view of a projecting apparatus according to a second embodiment of the invention.
Figure 3B:
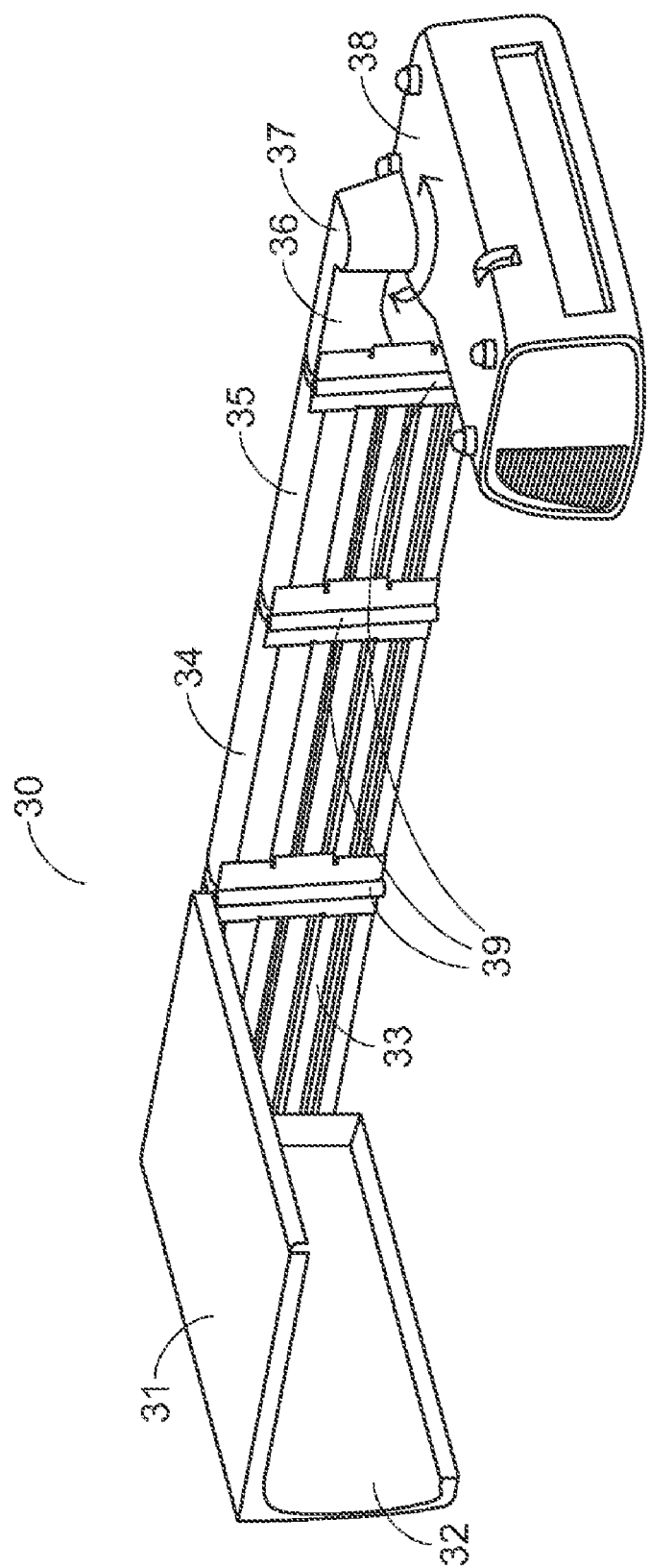
FIG. 3B is a schematic left-side view of the projecting apparatus according to the second embodiment of the invention.
Figure 3C:
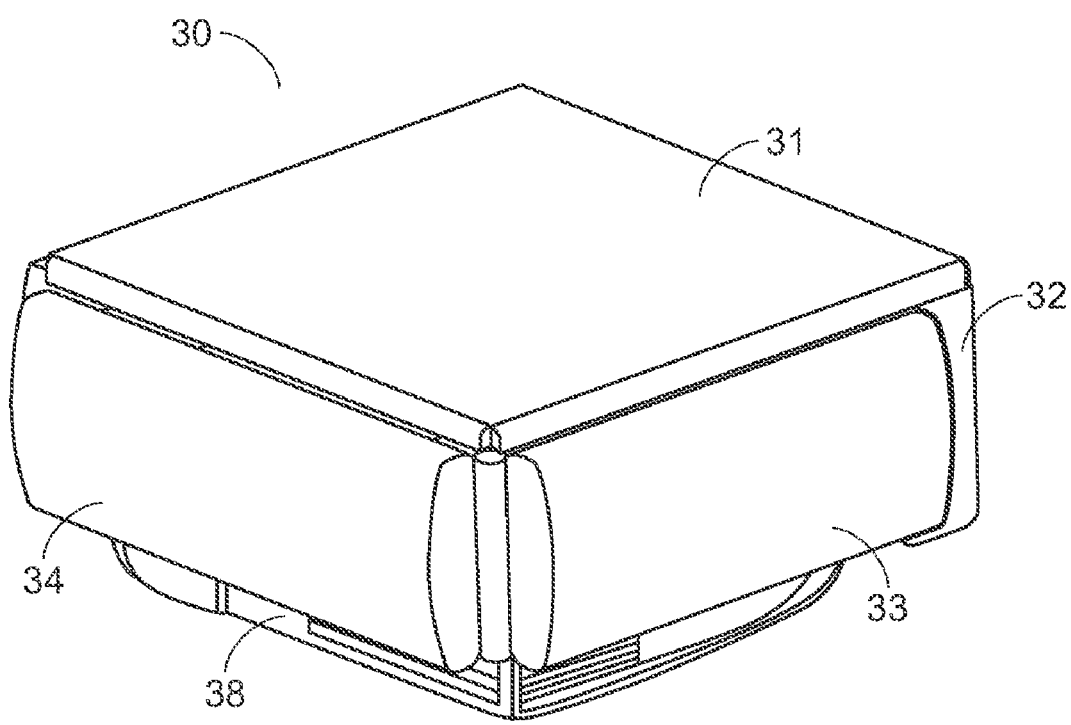
FIG. 3C is a schematic perspective view illustrating the projecting apparatus in a folded state according to the second embodiment of the invention.

Referring to FIGS. 3A, 3B and 3C, the projecting apparatus 30 includes a casing, a foldable arm set and a projector 38. The casing includes a top plate 31 and a rear plate 32. The foldable arm set includes several rotatable arms, and the rotatable arms are pivotally and serially connected with each other. The casing is produced by bending a sheet metal into an L-shaped platform according to the sheet metal technology. The L-shaped platform is divided into the top plate 31 and the rear plate 32. An edge surface of the top plate 31 or an edge surface of the rear plate 32 is pivotally connected to an end of a first rotatable arm 33 through a first hinge. Alternatively, the first rotatable arm 33 is fixedly connected with the edge surface of the top plate 31 or the edge surface of the rear plate 32. As shown in FIG. 3A, the end of the first rotatable arm 33 is fixedly connected with the rear plate 32. The other end of the first rotatable arm 33 is pivotally connected with an end of a second rotatable arm 34 through a second hinge. The other end of the second rotatable arm 34 is pivotally connected with an end of a third rotatable arm 35 through a third hinge. The other end of the third rotatable arm 35 is pivotally connected with an end of a fourth rotatable arm 36 through a fourth hinge. The other end of the fourth rotatable arm 36 is fixedly connected with a circular shaft 37. The projector 38 is pivotally connected with the circular shaft 37. In a case that these rotatable arms 33, 34, 35 and 36 of the foldable arm set are stretched to be vertical to the rear plate 32 to form a foldable arm set for supporting the projector 38. In particular, the design of the circular shaft 37 allows 360-degree rotation of the projector 38.

Referring to FIG. 3B, the rotatable arms 33, 34, 35 and 36 of the foldable arm set are pivotally connected with each other with hinges 39. In this embodiment, the hinges 39 are disposed at the inner side of the foldable arm set, and thus the appearance of the projecting apparatus 30 is more pleasing. Moreover, the hinges for connecting the rotatable arms of the foldable arm set are made of polyoxymethylene (POM) copolymer. As a consequence, in response to an external force, the rotatable arms may be stretched, bent or stayed at any position as required. Alternatively, the bending angles and the bending directions of the rotatable arms may be varied as required. Even if the rotatable arms are subject to vibration, the rotatable arms will not deviate from the original positions due to the excellent bending durability of the hinges. For enhancing esthetic purpose, the power cord or the signal wires of the projector 38 may go through the inner sides of the rotatable arms or the vacant portions of the rotatable arms.

Referring to FIG. 3C, the rotatable arms 33, 34, 35 and 36 of the foldable arm set may be folded along the casing to define the containing space for containing the projector 38 therein. After the junction between the foldable arm set and the casing is locked by means of a locking element (not shown), the projecting apparatus 30 is substantially box-shaped and has a burglarproof function. The casing of the projecting apparatus 30 is sheet metal body produced by the sheet metal technology. Due to the excellent rigidity, the sheet metal body is not easily broken or deformed. Especially when the peripheral device (e.g. a setting box or a loudspeaker) of the projector 38 is mounted on the top plate 31 of the casing, the space utilization of configuring the peripheral device is enhanced so as to save the storing space.

Figure 4A:
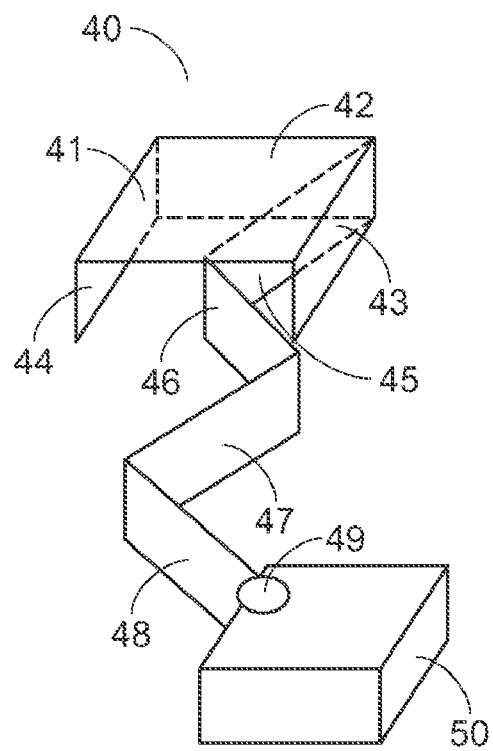
FIG. 4A is a schematic perspective view illustrating a projecting apparatus in an unfolded state according to a third embodiment of the invention.
Figure 4B:
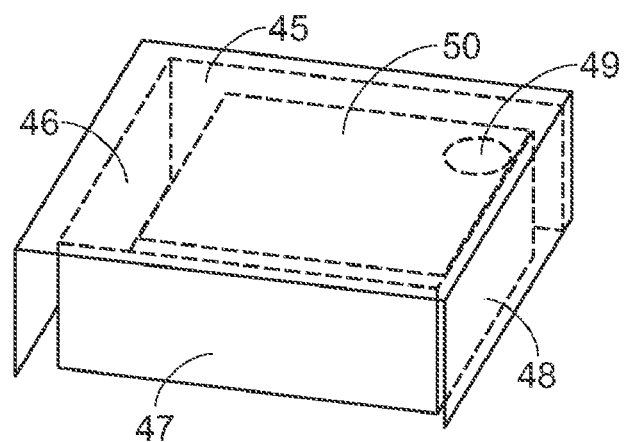
FIG. 4B is a schematic perspective view illustrating the projecting apparatus in a folded state according to the third embodiment of the invention.

Referring to FIGS. 4A and 4B, the improved projecting apparatus 40 includes a casing, a foldable arm set and a projector 50. The casing includes a top plate 41, a left plate 44, a right plate 43 and a rear plate 42. The casing is produced by bending a sheet metal according to the sheet metal technology. An edge surface of the top plate 41 or the rear plate 42 is pivotally connected to an end of a first rotatable arm 45 through a first hinge. Alternatively, the first rotatable arm 45 is fixedly connected with the edge surface of the top plate 41 or the rear plate 42. The other end of the first rotatable arm 45 is pivotally connected with an end of a second rotatable arm 46 through a second hinge. The other end of the second rotatable arm 46 is pivotally connected with an end of a third rotatable arm 47 through a third hinge. The other end of the third rotatable arm 47 is pivotally connected with an end of a fourth rotatable arm 48 through a fourth hinge. The other end of the fourth rotatable arm 48 is fixedly connected with a circular shaft 49. The projector 50 is pivotally connected with the circular shaft 49. In this context, the casing and the foldable arm set are collectively referred as a cantilever member. In response to an external force, the foldable arm set may be stretched or bent as required. When the rotatable arms 45, 46, 47 and 48 of the foldable arm set are stretched, the cantilever member is in an unfolded state and the projector 50 may perform the projecting operation. When the rotatable arms 45, 46, 47 and 48 of the foldable arm set are folded to be in a folded state, a containing space is defined by the casing and the foldable arm set for containing the projector 50 therein. In this embodiment, the rotatable arms are alternately bent in the left and right directions such that the containing space is defined by the casing and the foldable arm set. According to the user's requirement, the bending angles and the bending directions of the rotatable arms are variable. Hereinafter, a process of containing the projector 50 is illustrated with reference to FIGS. 4A and 4B. First of all, the foldable arm set is pushed toward the inner portion of the casing such that the first rotatable arm 45 is in direct contact with the rear plate 42. Next, the foldable arm set is continuously bent in the anti-clockwise direction. As such, the second rotatable arm 46 is in direct contact with the left plate 44, the third rotatable arm 47 is at the front side of the casing, the fourth rotatable arm 48 is in direct contact with the right plate 43, and the projector 50 is contained in the containing space. Afterwards, the junction between the foldable arm set and the casing is locked by means of a locking element (not shown), thereby formed a box-shaped structure with a burglarproof function, as shown in FIG. 4B.

From the above description, the projecting apparatus of the embodiments of the invention is assembled by combining a cantilever member and a projector together. The rotatable arms of the foldable arm set may be stretched or bent. In addition, the bending angles and the bending directions of the rotatable arms may be varied as required. When the projecting apparatus is in a folded state, the projecting apparatus is substantially box-shaped and has a burglarproof function. As a consequence, the possibility of losing the projector from stealing is largely reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without

What is claimed is:

1. A projecting apparatus comprising:
   a casing;
   a projector; and
   a foldable arm set connected with the projector and selectively in a folded state or an unfolded state, wherein the projector is capable of performing a projecting operation when the foldable arm set is in the unfolded state, and a containing space is defined by the foldable arm set and the casing for containing the projector therein when the foldable arm set is in the folded state,
   wherein the foldable arm set comprises a plurality of rotatable arms, and the rotatable arms are pivotally and serially connected with each other, when the foldable arm set is in the folded state, the rotatable arms are disposed adjacent to sides of the projector, respectively, and a length of each side of the containing space surrounding the projector is greater than a length of a corresponding side of the projector.

2. The projecting apparatus according to claim 1, wherein the casing comprises a top plate and a rear plate, and the foldable arm set is connected to at least one of the top plate and the rear plate.

3. The projecting apparatus according to claim 2, wherein an end of the rotatable arms connected with each other serially is connected to the rear plate.

4. The projecting apparatus according to claim 1, wherein the rotatable arms of the foldable arm set are aluminum extrusion tubes, and the rotatable arms are produced by the aluminum extrusion technology.

5. The projecting apparatus according to claim 1, wherein the casing is fixed on a wall in a suspended manner or a wall-hung manner.

6. The projecting apparatus according to claim 1, wherein the other end of the rotatable arms connected with each other serially is pivotally connected to the projector.

7. The projecting apparatus according to claim 1, wherein the casing is produced by the sheet metal technology.

8. The projecting apparatus according to claim 1, further comprising a locking element, wherein after the projector is contained in the containing space defined by the foldable arm set and the casing, the junction between the foldable arm set and the casing is locked by the locking element.

9. The projecting apparatus according to claim 1, wherein the rotatable arms are pivotally and serially connected with each other through hinges, and the hinges are made of plastic or steel material.

* * * * *